United States Patent
Liu

[11] Patent Number: 6,070,359
[45] Date of Patent: Jun. 6, 2000

[54] FLOWER POT STRUCTURE WITH A NATURAL WATER SUPPLY SYSTEM

[76] Inventor: Shan Pu Liu, 5F-23, 70, Fu-Shing Road, Taoyuan, Taiwan

[21] Appl. No.: 09/085,403

[22] Filed: May 26, 1998

[51] Int. Cl.[7] .......................... A01G 25/00; A01G 29/00
[52] U.S. Cl. ................................. 47/79; 47/48.5; 47/80
[58] Field of Search .......................... 47/79, 41.01, 48.5, 47/80, 64

[56] References Cited

U.S. PATENT DOCUMENTS

| | | | |
|---|---|---|---|
| 1,231,975 | 7/1917 | Weitzel | 47/79 |
| 1,231,976 | 7/1917 | Weitzel | 137/432 |
| 1,810,236 | 6/1931 | Bender | 47/79 |
| 2,228,892 | 1/1941 | Zimmerman | 47/79 |
| 2,306,027 | 12/1942 | Swaney | 47/79 |
| 4,016,677 | 4/1977 | Julinot | 47/64 |
| 4,843,757 | 7/1989 | O'hara, Jr. | 47/48.5 |
| 4,937,972 | 7/1990 | Freitus | 47/62 |
| 5,046,282 | 9/1991 | Whitaker | 47/79 |
| 5,097,626 | 3/1992 | Mordoch | 47/79 |
| 5,212,905 | 5/1993 | Philoctete | 47/48.5 |
| 5,272,835 | 12/1993 | Stern | 47/79 |
| 5,501,037 | 3/1996 | Aldokimov et al. | 47/58 |
| 5,546,700 | 8/1996 | Kumpf | 47/79 |
| 5,832,870 | 11/1998 | Lin | 119/261 |

FOREIGN PATENT DOCUMENTS 5049349   3/1993   Japan ..................................... 47/79 C

*Primary Examiner*—Michael J. Carone
*Assistant Examiner*—Son T. Nguyen
*Attorney, Agent, or Firm*—Dougherty & Troxell

[57] ABSTRACT

A flower pot structure with a natural water supply system including a pot body, a main water storage region, an upper cover, a central soil region, and a water supply device. The main water storage region is annular and located in an upper position of the pot body. The pot body and the main water storage region are adhered as a whole with the upper cover. The circumference of the main water storage region receives the water supply device. The water supply device includes a water duct, an air duct, a filter, and a flow regulating valve, with a large portion of the water duct located above a baseplate of the main water storage region. The water duct has a water inlet at a front end and a water outlet at a rear end. The water inlet and water outlet are slightly inclined at different heights. The air duct is substantially upright and disposed on the water duct at a rear section of the flow regulating valve at a suitable position. The air duct communicates with the water duct. That part near the water outlet at the rear section is sealed after passing through the baseplate of the main water storage region, and that part going below the baseplate supply water to the central soil region.

3 Claims, 6 Drawing Sheets

FLOWER POT STRUCTURE WITH A NATURAL WATER SUPPLY SYSTEM

BACKGROUND OF THE INVENTION (a) Field of the Invention

The present invention relates to a flower pot structure with a natural water supply system, and more particularly to a flower pot structure that may supply any plants with the necessary water moisture for a long period of time to eliminate the trouble of frequent watering.

(b) Description of the Prior Art

Growing plants is a hobby and enjoyment for many people. In cities where living space is limited, plants are usually grown in pots instead of in a yard or garden. Plants need watering and may wither if not watered for a few days. It is a pity if a precious plant or bonsai wither when the grower is out of town or on trip for some days.

Conventional flower pots have holes in the bottom side, and water will flow out to wet the floor or table on which they are placed. Therefore a plate is generally used to support the flower pot for collecting overflowing water. However, as the water has flowed through the soil, it is dirty looking and unsightly. Besides, mosquitoes may breed in the plate. Children may also play with the dirty water, which is not hygienic.

To try to solve the above problems, there is developed a type of water inducing bundles that can constantly absorb water on the wall of the pot and guide it to the soil of the pot. Although this may keep the soil wet, the roots of the plant in the pot may decay. This is because the roots need to absorb organic nutrients in the soil. But if the roots are constantly wet, the metabolism of organisms in the soil will be poor, and the roots do not have enough nutrients. Worst still, fungi may grow to infect the plant. Furthermore, neither of the above-mentioned conventional flower pots is provided with any device to regulate water supply to the plant or provide a device to maintain sufficient water in the pot when the pot is left unattended for days.

SUMMARY OF THE INVENTION

A primary object of the present invention is to provide a flower pot structure with a natural water supply system to eliminate the drawbacks with the prior art, in which water is supply in natural cycles at set time intervals at set amounts to provide a potted plant with water for a long period of time, so as to eliminate the trouble of watering and ensure that the plant does get sufficient and suitable amount of water.

Another object of the present invention is to provide a flower pot structure with a natural water supply system, in which a water supply is provided intermittent and long-term watering by an ingenious use of water pressure, the atmospheric pressure, and water tension in a balancing state. It also sends air bubbles to the soil to help improve the soil and the roots.

A further object of the present invention is to provide a flower pot structure with a natural water supply system, in which a central soil region is provided to give the roots much more space to grow, so that the flower pot structure may be adapted for growing any kind of plant and flower.

Still another object of the present invention is to provide a flower pot structure with a natural water supply system, in which a pot body and a main water storage region are integrally adhered as a whole so as to keep the pot body clean and nice looking. The main water storage region is configured to be transparent to allow the grower to observe the flow of air and water inside, which not only is interesting to look at but also allows the grower to observe the growth of the plant or flower in the pot.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
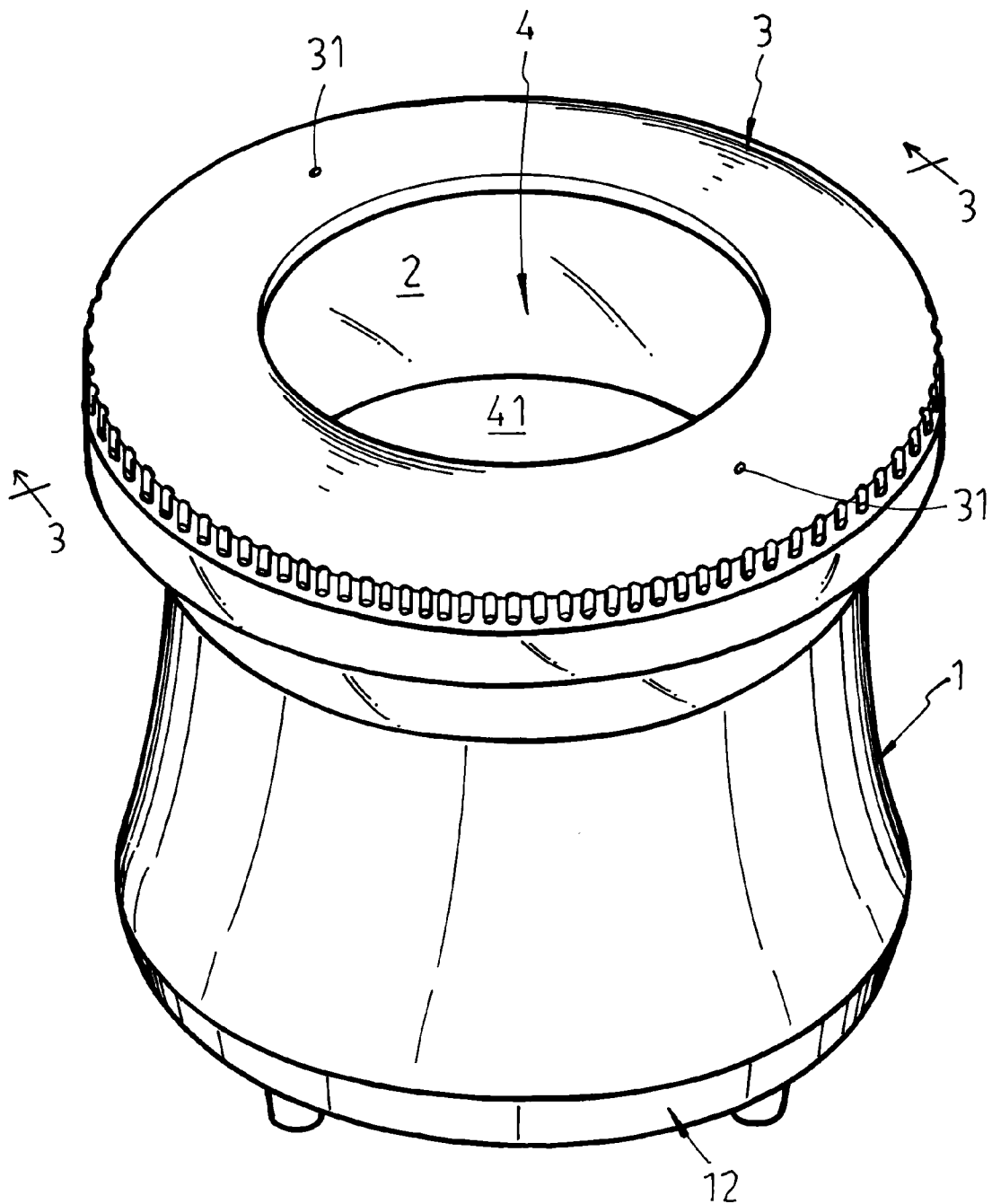
FIG. 1 is a perspective view of the present invention.
Figure 2:
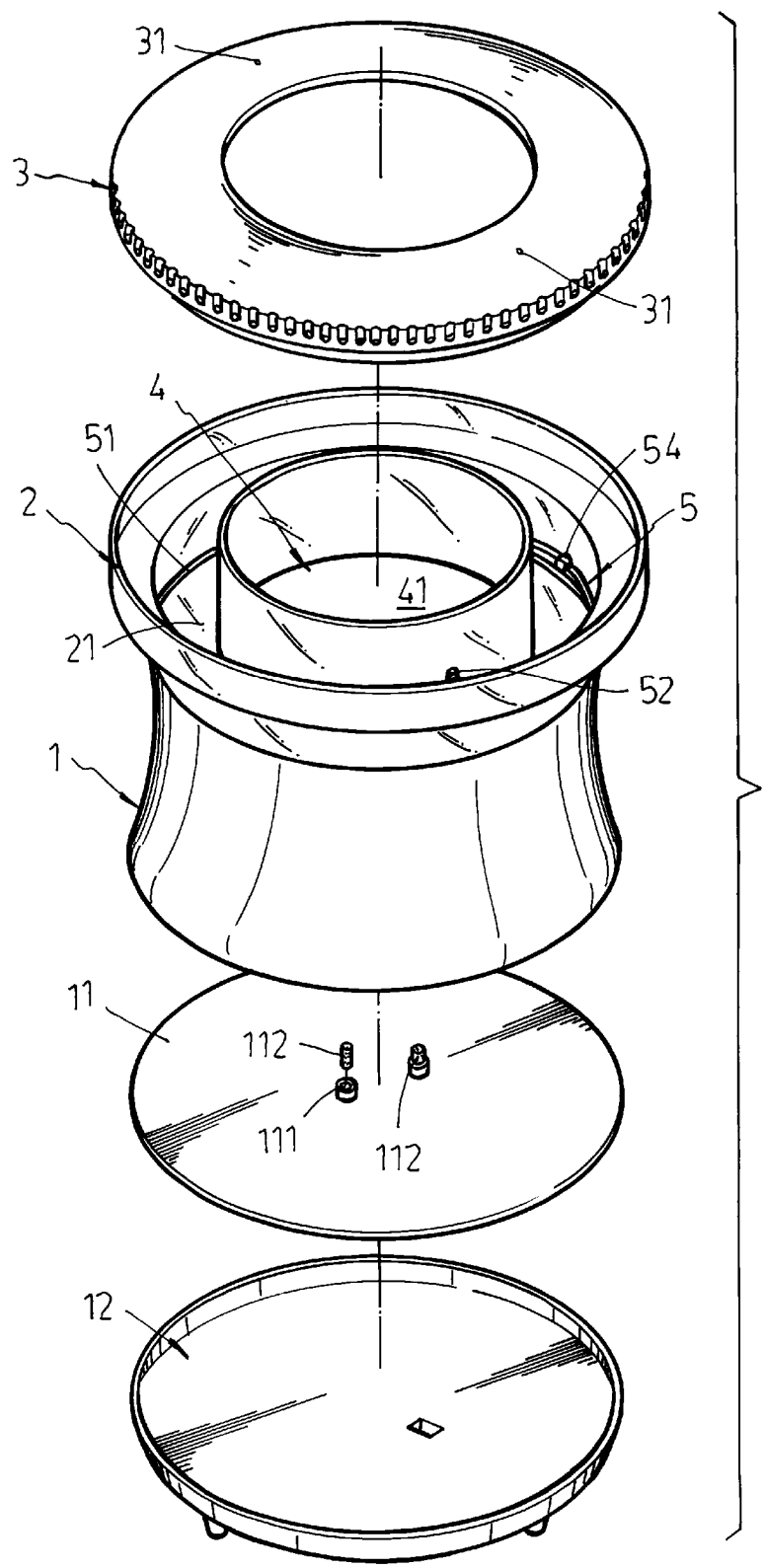
FIG. 2 is a perspective exploded view of the present invention.
Figure 3:
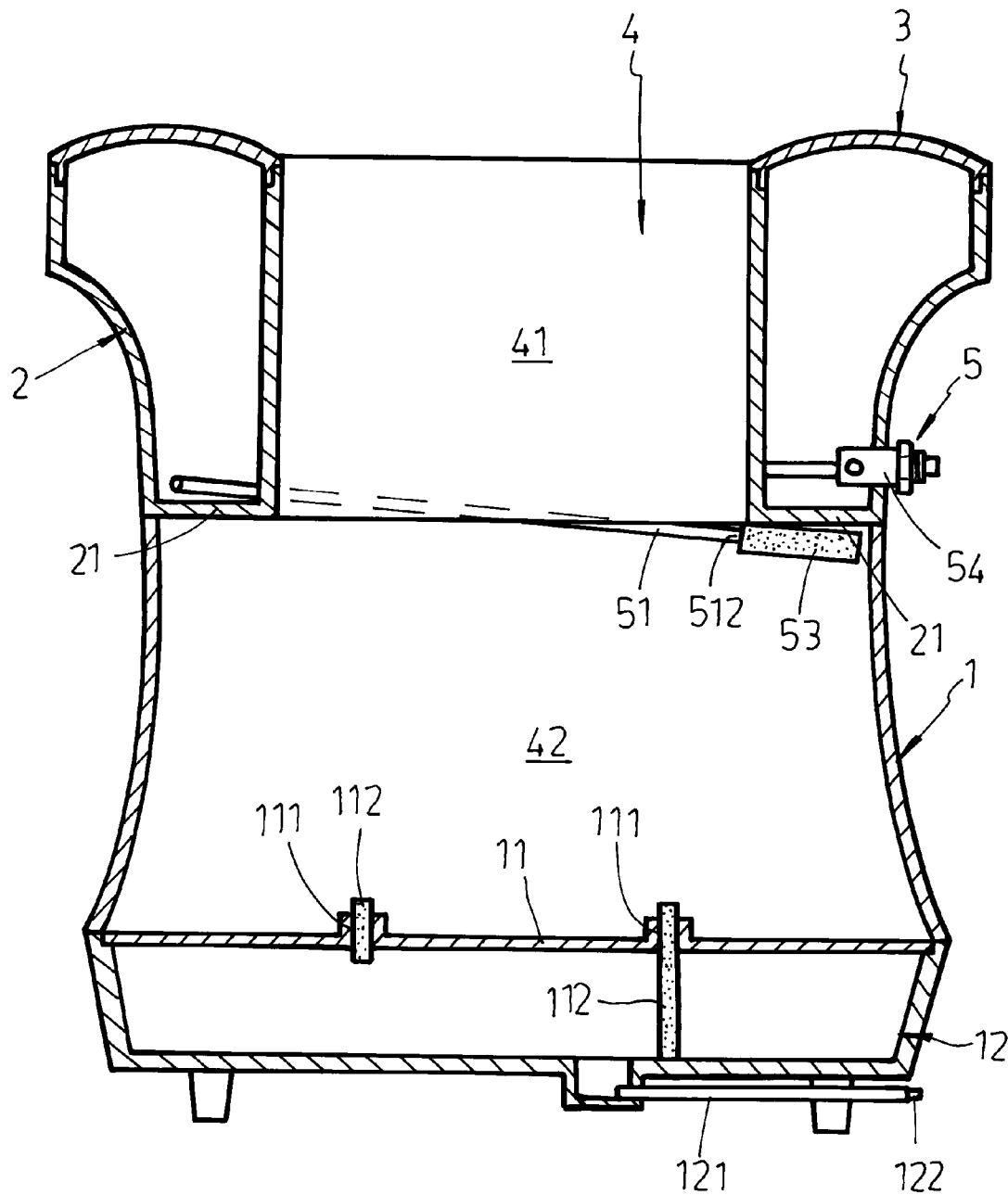
FIG. 3 is a sectional view taken along line 3—3 and seen from the direction of the arrows of FIG. 1.
Figure 4:
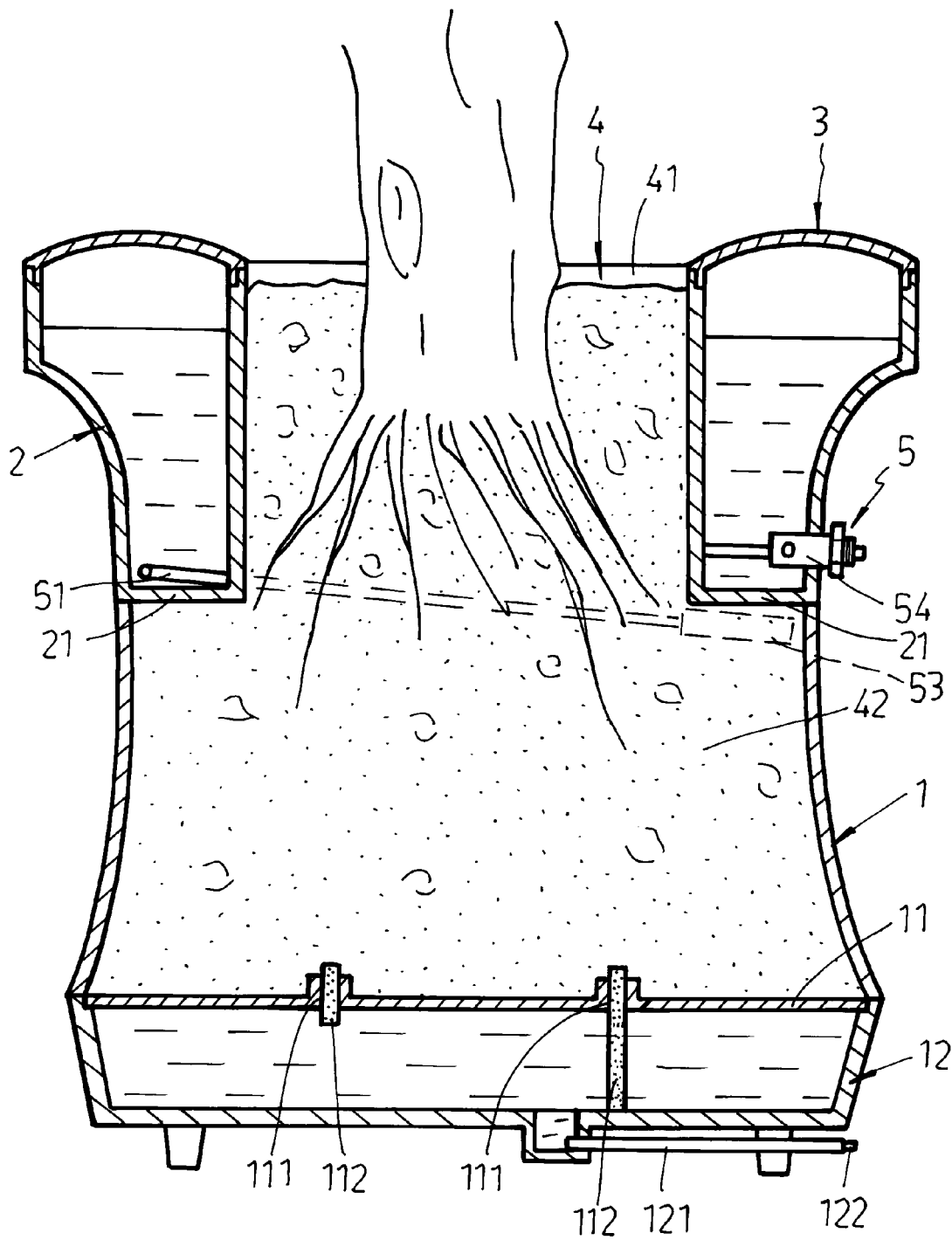
FIG. 4 is a sectional schematic view showing the present invention in use.

With reference to FIGS. 1–4, the present invention comprises a pot body 1 a main water storage region 2, an upper cover 3, and a water supply device 5. The pot body 1 and the main water storage region 2 are adhered together to form a central soil region 4 for growth of plants. The central soil region 4 in the flower pot includes a planting portion 41 and a root growing space 42. in which the root growing space 42 provides a larger growing environment for any flowers and plants to give them larger living space and make it easier for them to absorb nutrients. As for the main water storage region 2. its upper side is adhered to the upper cover 3, which has convection holes 31 to permit convection in the main water storage region. A partition plate 11 and a water collecting region 12 are provided at a lower side within the pot body 1. The water collecting region 12 allows water not absorbed by the soil to flow through a through hole 111 of the partition plate 11 into the water collecting region 12 for storage. Sponge pieces 112 are disposed in the through hole 111, and one of the sponge pieces 112 extend to a bottom side of the water collecting region 12 to absorb water moisture in the water collecting region 12. When the water in the central soil region 4 in the pot body 1 is not sufficient, a longer sponge piece 112 may be used to automatically supply the necessary water. The water collecting region 12 has a water discharge tube 121 at its bottom side, which may be stopped by a stopper 122 when the pot is placed indoors for display, so as to prevent water flowing out of the pot to the floor or table. When the pot is placed outdoors, the stopper 122 may be removed. If it rains, the water discharge tube 121 will allow excessive water in the pot to flow out.

Referring to FIGS. 4–8. the main water storage region 2 may receive the water supply device 5, which includes a water duct 51, an air supply duct 52, a filter 53. and a flow regulating valve 54. A large part of the water duct 51 is located above a baseplate 21 of the main water storage region 2, and its water inlet 511 and water outlet 512 are slightly inclined at different heights. The air duct 52 is substantially vertical and is provided at the water duct 51 at a suitable position to communicate with the water duct 51. That part near a rear section of the water inlet 511 passing through the baseplate 21 of the main water storage region 2 into the lower side of the baseplate 21 is sealed to prevent entry of sand or mud, which will pollute the water in the main water storage region 2. The filter 53 connecting to the water outlet 512 may supply water to the central soil region 4. It is made of bubbled stone material to prevent reverse flow of sand and soil which may cause blockage.

Figure 5:
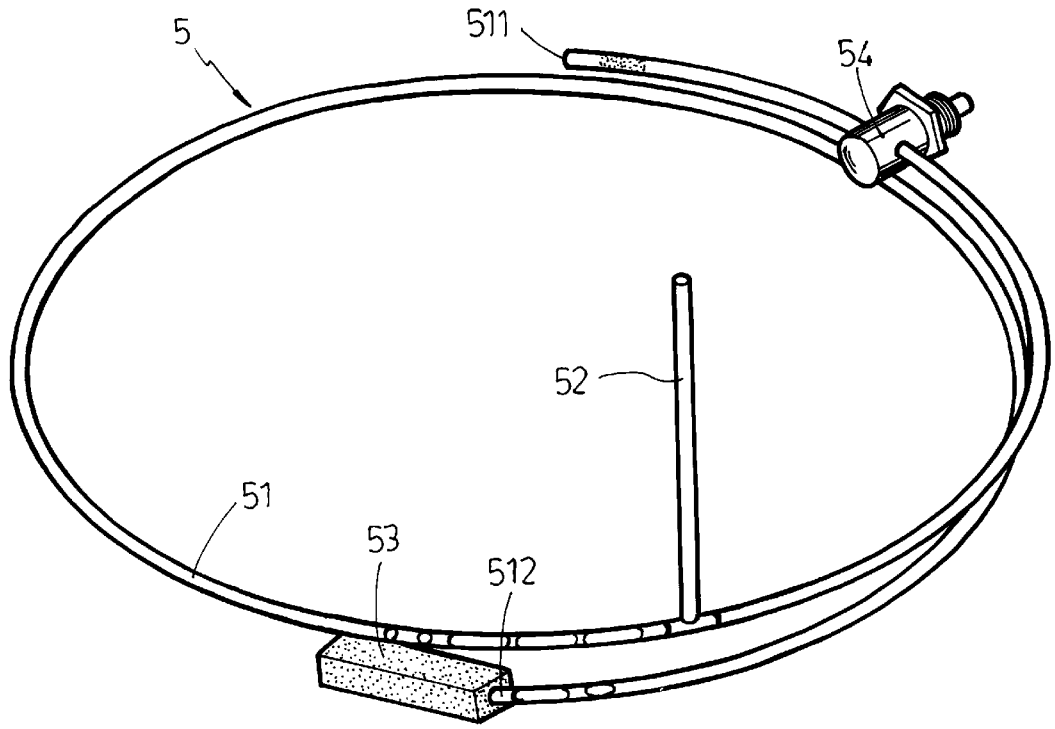
FIG. 5 is a schematic view illustrating the cyclical operation of the water supply device of the present invention in use.
Figure 6:
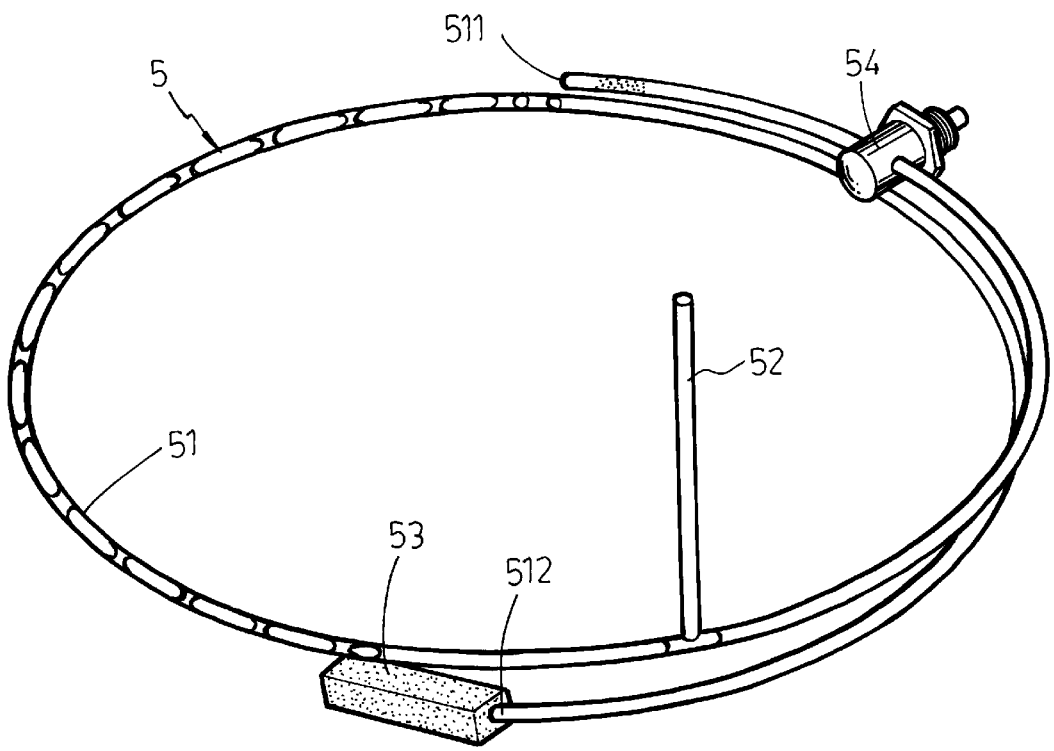
FIG. 6 is another schematic view illustrating the cyclical operation of the water supply device of the present invention in use.
Figure 7:
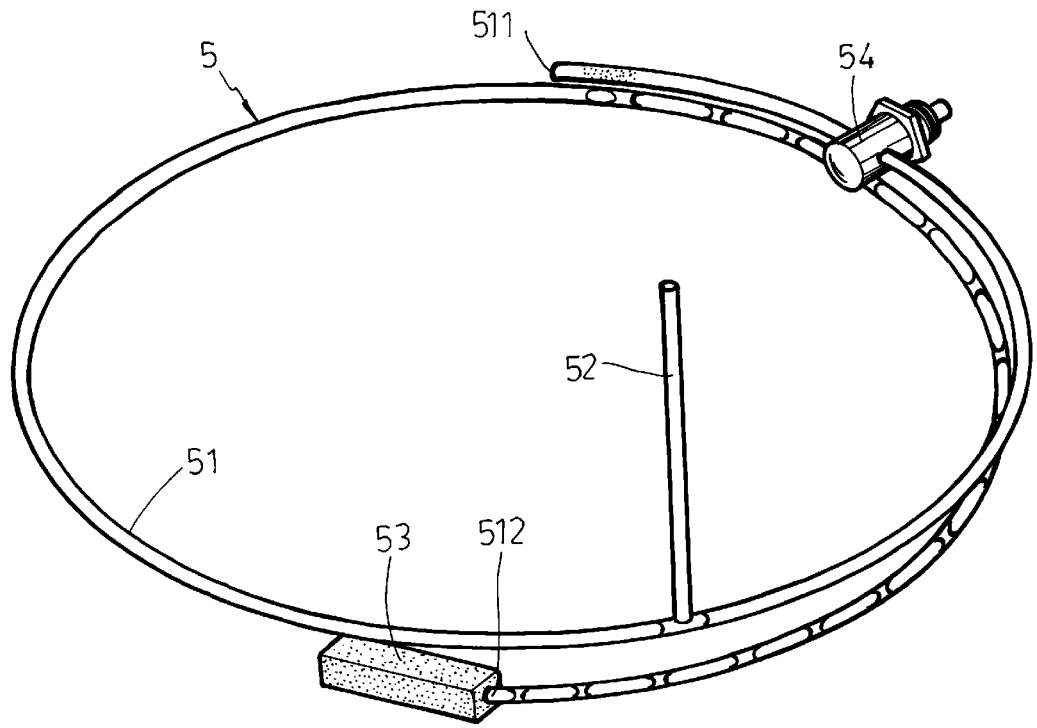
FIG. 7 is still another schematic view illustrating the cyclical operation of the water supply device of the present invention in use.
Figure 8:
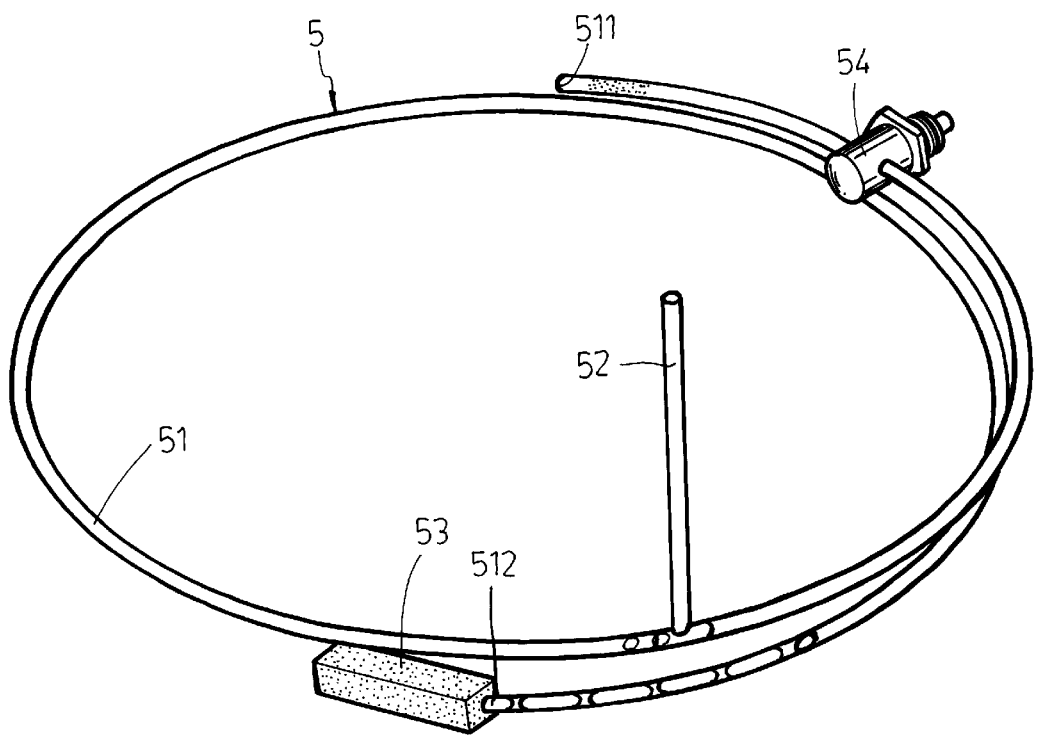
FIG. 8 is a further schematic view illustrating the cyclical operation of the water supply device of the present invention in use.

Referring to FIGS. 5–8, the water supply device 5 of the present invention adopts a natural method of regulation. It makes use of the natural cycle of water and air to supply water to any plants for a long period of time. The cycling of water and air in the water supply device 5 is demonstrated in FIGS. 5–8, as follows: In FIG. 5, when water enters the water duct 5 lvia water inlet 511, the water duct 51 will be filled with water and the speed of water flow is fast. Since water entering the water inlet 511 is regulated by the flow regulating valve 54, there is reduced water flow in the duct. When water flow is inadequate, air may be introduced via the air duct 52 to form air bubble sections for supplementation. Referring to FIG. 6, when a long series of air bubble sections are formed in the duct, the water flow is decreased so that the speed of water becomes slower. And by means of the control of the flow regulating valve 54, the water supply amount may satisfy the space of the duct. When there are a certain amount of air bubble sections in the duct, the air duct 52 will no longer allow entry of air. Referring to FIG. 7, when the air bubble sections flow to the rear section of the air duct 52, since there is only a little amount of water between adjacent air bubble sections, the expulsion of air will become faster and faster, so that water sections will increase and flow will speed up. Referring to FIG. 8, when the air bubble sections are almost pushed out, the water duct 51 is almost filled with water. Under the acceleration of gravity when the pressure of water in the duct reaches a critical point (i.e., the amount of outgoing water is greater than that of water coming in via the flow regulating valve 54), water cannot positively fill the water duct 51. Then the air duct 52 will allow entry of air into the duct, as illustrated in FIG. 5. Water is then cycled in the sequence of FIGS. 5–8. Fromn the air in the air bubble sections being completely pushed out to approach the rear end of the filter 53 to the front end of the first air bubble of a newly generated air bubble section, that is he amount of water supply for each set time interval. The set time interval is 3–4 hours or longer. In this way the present invention achieves the object of supplying water in natural cycles at time intervals.

However, the setting of water supply cycles is related to the flow regulating valve 54. The function of the flow regulating valve 54 is to reduce the flow in the water duct 51 regulate water supply and control the flow rate at each water supply time interval. The smaller the flow of water passing through the flow regulating valve 54, the longer the water supply time interval and the air bubbles sections. On the contrary, the greater the water flow, the shorter the air bubbles sections and the water supply time interval.

The flower pot structure of the present invention provides a natural water supply system in which water is supplied at set time intervals after being regulated by a water supply device and to make use of the natural cycles of air and water to achieve intermittent water supply. The main water storage region is made transparent, making it possible to observe the cycles of water and air inside, which not only is interesting to look at but also allows the grower to understand the water supply conditions.

In summary, the flower pot with natural water supply structure according to the present invention is a utilization of the natural cycles of water and air to provide a better growing environment for plants and flowers.

Although the present invention has been illustrated and described with reference to the preferred embodiment thereof, it should be understood that it is in no way limited to the details of such embodiment but is capable of numerous modifications within the scope of the appended claims.

What is claimed is:

1. A flower pot structure with a natural water supply system, comprising a pot body, a main water storage region, an upper cover, a central soil region, and a water supply device, said main water storage region being annular and provided in an upper position of said pot body, said main water storage region and said pot body being adhered as a whole with said upper cover, the circumference of said main water storage region receiving said water supply device, wherein said water supply device includes a water duct, an air duct, a filter, and a flow regulating valve, a large portion of said water duct being located above a baseplate of said main water storage region and having a water inlet at a front end and a water outlet at a rear end, said water inlet and water outlet being slightly inclined at different heights, said air duct being substantially upright and disposed on said water duct at a rear section of said flow regulating valve at a suitable position, said air duct communicating with said water duct, that part near said water outlet at the rear section being sealed after passing through said baseplate of said main water storage region, and that part going below said baseplate supplying water to said central soil region.

2. The flower pot structure with a natural water supply system as defined in claim 1, wherein said water duct of said water supply device is provided with a flow regulating valve at the front section at a suitable position to regulate the amount of flow.

3. The flower pot structure with a natural water supply system as defined in claim 1, wherein said water outlet of said water duct below said baseplate of said main water storage region is fittingly provided with a filter to prevent reverse flow of sand and mud to cause blockage.

* * * * *